United States Patent
Zhang et al.

(10) Patent No.: US 11,615,547 B2
(45) Date of Patent: Mar. 28, 2023

(54) LIGHT FIELD IMAGE RENDERING METHOD AND SYSTEM FOR CREATING SEE-THROUGH EFFECTS

(71) Applicant: SHANGHAITECH UNIVERSITY, Shanghai (CN)

(72) Inventors: Yingliang Zhang, Shanghai (CN); Guli Zhang, Shanghai (CN); Zhiru Shi, Shanghai (CN)

(73) Assignee: ShanghaiTech University, Shanghai (CN)

( * ) Notice: Subject to any disclaimer, the term of this patent is extended or adjusted under 35 U.S.C. 154(b) by 171 days.

(21) Appl. No.: 16/877,471

(22) Filed: May 18, 2020

(65) Prior Publication Data

US 2020/0279387 A1 Sep. 3, 2020

Related U.S. Application Data

(63) Continuation of application No. PCT/CN2018/116252, filed on Nov. 19, 2018.

(30) Foreign Application Priority Data

Nov. 20, 2017 (WO) ................ PCT/CN2017/111911

(51) Int. Cl.
*G06T 7/557* (2017.01)
*G06F 17/18* (2006.01)
(Continued)

(52) U.S. Cl.
CPC .............. *G06T 7/557* (2017.01); *G06F 17/18* (2013.01); *G06K 9/623* (2013.01); *G06K 9/6215* (2013.01);
(Continued)

(58) Field of Classification Search
CPC ........... G06T 7/557; G06T 2207/10052; G06T 2207/20076; G06T 2207/20081;
(Continued)

(56) References Cited

U.S. PATENT DOCUMENTS

| 8,535,229 | B2 * | 9/2013 | Umemura | G01S 15/8993 |
| | | | | 600/407 |
| 2004/0004726 | A1 * | 1/2004 | Sezginer | G01N 21/956 |
| | | | | 356/601 |

(Continued)

FOREIGN PATENT DOCUMENTS

WO    2015/100301 A1    7/2015

OTHER PUBLICATIONS

PCT International Search Report and the Written Opinion dated Feb. 19, 2019, issued in corresponding International Application No. PCT/CN2018/116252 (8 pages).

*Primary Examiner* — John W Lee
(74) *Attorney, Agent, or Firm* — Sheppard Mullin Richter & Hampton LLP

(57) ABSTRACT

A light field image processing method is disclosed for removing occluding foreground and blurring uninterested objects, by differentiating objects located at different depths of field and objects belonging to distinct categories, to create see-through effects. In various embodiments, the image processing method may blur a background object behind a specified object of interest. The image processing method may also at least partially remove from the rendered image any occluding object that may prevent a viewer from viewing the object of interest. The image processing method may further blur areas of the rendered image that represent an object in the light field other than the object of interest. The method includes steps of constructing a light field weight function comprising a depth component and a semantic (Continued)

component, where the weight function assigns a ray in the light field with a weight; and conducting light field rendering using the weight function.

16 Claims, 15 Drawing Sheets

(51) Int. Cl.
*G06K 9/62* (2022.01)
*G06N 3/08* (2006.01)
*G06T 15/50* (2011.01)

(52) U.S. Cl.
CPC ......... *G06K 9/6259* (2013.01); *G06K 9/6277* (2013.01); *G06N 3/08* (2013.01); *G06T 2207/10052* (2013.01); *G06T 2207/20076* (2013.01); *G06T 2207/20081* (2013.01); *G06T 2207/20084* (2013.01)

(58) Field of Classification Search
CPC ....... G06T 2207/20084; G06T 2200/21; G06T 15/50; G06F 17/18; G06K 9/6215; G06K 9/623; G06K 9/6259; G06K 9/6277; G06N 3/08
See application file for complete search history.

(56) References Cited

U.S. PATENT DOCUMENTS

| | | | |
|---|---|---|---|
| 2015/0043806 A1* | 2/2015 | Karsch | G06T 11/60 382/154 |
| 2015/0279056 A1 | 10/2015 | Akeley | |
| 2016/0350930 A1* | 12/2016 | Lin | G06V 10/82 |
| 2017/0011545 A1 | 1/2017 | Munkberg et al. | |
| 2017/0148199 A1 | 5/2017 | Holzer et al. | |
| 2018/0059679 A1* | 3/2018 | Taimouri | G06N 3/08 |

\* cited by examiner

500

502 constructing a weight function for the light field comprising a depth component and a semantic component, where the weight function assigns a ray in the light field with a weight

504 conducting light field rendering using the weight function, wherein the depth component and the semantic component of the weight function respectively assigns a depth-guided weight and a label-guided weight to a ray, and a joint weight for the ray is calculated by multiplying the depth-guided weight and the label-guided weight

602 calculating, for each ray, a depth value representing a depth of field of a corresponding pixel in the rendered image

604 assigning to each ray a classification label, wherein each classification label corresponds to one of the distinct categories and wherein a ray assigned a same classification label with rays corresponding to the object of interest is given a higher rendering weight than a ray assigned a different classification label

606 rendering the plurality of rays in a weighting scheme by assigning, for each ray, a depth-guided weight and a label-guided weight and calculating a joint weight for the each ray by multiplying the depth-guided weight and the label-guided weight

FIG. 6

700 (Step 602)

702 training a convolutional neural network using a data set with similar and dissimilar pairs of images

704 applying the trained convolutional neural network to each image patch of the pair of images to obtain an initial matching cost for the each image patch

706 applying a stereo method to refine the matching cost for the each image patch and to determine a disparity value for the each image patch

708 determining the depth value for each ray based on the disparity map and a distance between centers of the cameras

FIG. 7

800 (Step 604)

802 computing a probability distribution for each pixel of the rendered image using a convolutional neural network, wherein the probability distribution for each pixel comprises probabilities that the pixel belongs to each one of the distinct categories, respectively

804 calculating a confidence score for each pixel's probability distribution

806 determining that a pixel's probability distribution is unreliable when the calculated confidence score for the pixel's probability distribution is below a threshold and specifying any rays that correspond to the pixel as unlabeled

808 assigning, for each of remaining pixels whose probability distribution is not determined to be unreliable, a classification label having a highest probability among the probability distribution to all ray corresponding to the each one of the remaining pixels

810 recalculating classification label assignments for rays that correspond to distinct objects that are separate in depth of field and rays specified as unlabeled based on depth values of these rays

FIG. 8

900 (Step 810)

902 creating, for each classification label assigned to the remaining pixels, a probability distribution function for each classification label by fitting a normal distribution with the depth values of all rays to which the each classification label is assigned

904 determining, for each pixel corresponding to unlabeled rays and each of the remaining pixels, a classification label whose probability distribution function value with respect to a depth value for the each pixel is highest among other classification labels

906 assigning the classification label to rays corresponding to the each pixel

908 assigning pixels belonging to a ground plane as unlabeled, wherein a portion of the ground plane has been assigned a same classification label with an object having a same depth value with the portion of the ground plane

FIG. 9

(a) input view (b) near plane rendering (c) middle plane rendering (d) far plane rendering (a) input view (b) semantic see-through rendering (c) regular refocusing

LIGHT FIELD IMAGE RENDERING METHOD AND SYSTEM FOR CREATING SEE-THROUGH EFFECTS

CROSS REFERENCE TO RELATED APPLICATIONS

The present application is a continuation application of International Patent Application No.: PCT/CN2018/116252, filed on Nov. 19, 2018, which is based on and claims the benefit of priority to International Application under Patent Cooperation Treaty, No.: PCT/CN2017/111911, filed on Nov. 20, 2017. The above-reference applications are incorporated herein by reference in their entirety.

BACKGROUND

1. Field of the Invention

The present invention relates to image processing, and more particularly, to light field image rendering for creating semantic see-through effects.

2. Description of Related Art

Conception and recent development of light field image processing theories and algorithms provide rising opportunities of new and innovative applications of this new technology in many areas. On the one hand, new and high performance hardware components contribute to those new opportunities, particularly high performance graphics processing units (GPU) and digital cameras capable of capturing and processing large amount of image data. Many of those hardware components have recently become easily accessible at more affordable costs. On the other hand, rapid developments in computer vision and pattern recognition technologies, coupled with advances in artificial intelligence and deep leaning algorithms, enable full and sophisticated utilization of these new computing resources leading these opportunities of the light field imaging era to a prospective commercial success.

One of those new areas is light field image rendering with an objective to create see-through effects in the rendered images. Traditionally, this is achieved through refocusing technology largely based on light field depth only, which can have significant limitation and deficiency. In this regard, currently available technologies have not been able to fully take advantages of the power of the most recent technology developments in the area.

For instance, in security surveillance, the capability of seeing a subject of interest through occluders can be crucial. However, refocusing technology alone often fails to adequately remove or blur an occluding object for sufficient identification and/or recognition of the occluded object at the full potential. In certain circumstances, this may determine whether a suspected terrorist or a dangerous criminal can be identified or not.

Therefore, there are needs in the field of light field image rendering for improved methods and systems to create more effective see-through effects.

SUMMARY

The present invention provides among other things image processing methods and system, and particularly light field image rendering methods and systems, for creating see-through effects in rendered images by removing occluding foreground and blurring uninterested objects in the light field.

In general, during a light field image rendering process, embodiments of the light field image rendering methods and systems may differentiate objects in the light field located at different depths of field, as well as objects belonging to distinct categories. For example, an object of interest and its background or foreground can be differentiated during the light field image rendering process, as well as cars and pedestrians belonging to different classifications.

In various embodiments, the image processing method may blur a background object behind a specified object of interest. The image processing method may also at least partially remove from the rendered image any occluding object that may prevent a viewer from viewing the object of interest. In addition, the image processing method may further blur areas of the rendered image that represent an object in the light field other than the object of interest.

For example, if an identified object of interest is a car located between a building as its background and a pedestrian walking in front of the car that partially blocks view of the car, the rendered image may blur and/or remove at least partially the pedestrian, in addition to blurring the background building.

Embodiments of the invention achieve the above objects by, among other things, assigning to each light field ray a depth-guided weight based on its depth value and a label-guided weight based on its label assignment and rendering the rays in a weighting scheme. The depth value and label assignment for each ray are computed by using two complex neural networks, respectively. In some embodiments, the initial classification label assignments are refined by further employing the depth information. In some embodiments, the label-guided weights are assigned further based on depth values associated with each label.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

A more complete understanding of the present invention may be derived by referring to the detailed description when considered in connection with the following illustrative figures. In the figures, like reference numbers refer to like elements or acts throughout the figures.

FIG. 5 illustrates a flowchart for an image processing method according to an embodiment of the present invention.

FIG. 6 illustrates a flowchart for generating a rendered image according to an embodiment of the present invention.

FIG. 7 illustrates a flowchart for generating a disparity map of the rendered image according to an embodiment of the present invention.

FIG. 8 illustrates a flowchart for assigning to each ray a classification label according to an embodiment of the present invention.

FIG. 9 illustrates a flowchart for recalculation for classification label assignment according to an embodiment of the present invention.

Elements and acts in the figures are illustrated for simplicity and have not necessarily been rendered according to any particular sequence or embodiment.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

This disclosure describes a novel semantic see-through technique that renders wide-aperture refocusing effects on light fields in terms of both the target's focal depth and the rays' semantic labels. The proposed technique mainly has three key contributions.

First, we propose a novel semantic light field refocusing technique that can provide high quality see-through effects. Different from traditional light field rendering, our technique effectively exploits semantic difference between rays and depth cue when conducting light field rendering. Since any 3D position can only be uniquely occupied by a single object, our technique manages to avoid blending objects belong to different layers which commonly occurs in light field rendering. To our knowledge, this is the first work in light filed rendering that directly incorporates semantic analysis.

Figure 3:
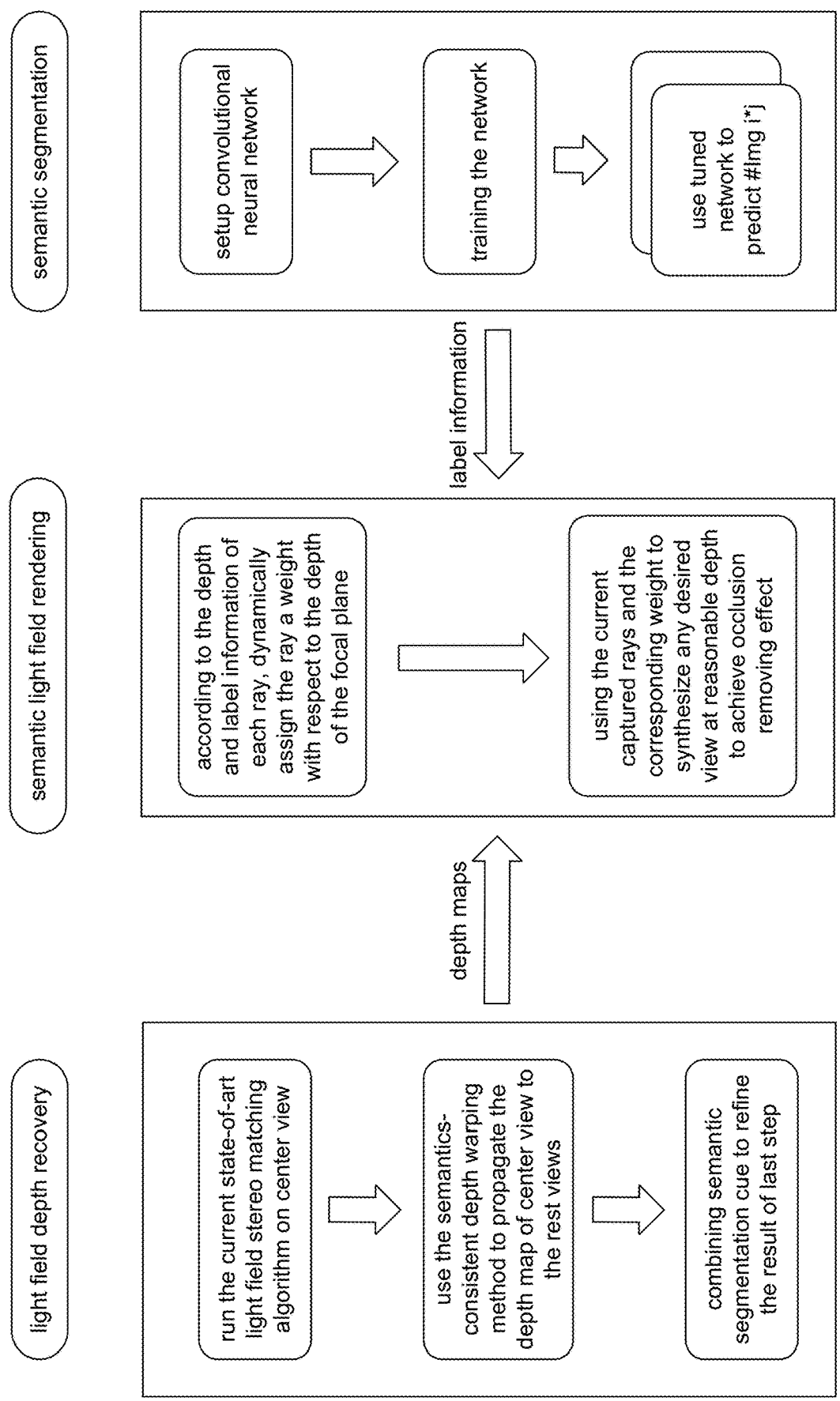
FIG. 3 illustrates an overview flowchart of semantic light field rendering according to an embodiment of the present invention.

The overview flowchart of semantic light field rendering is shown as FIG. 3.

Second, to robustly assign each ray a weight, we have conducted numerous experiments and eventually designed an effective weighting function. Such function is tolerant with slight depth error and semantic labeling error. The function is composed of two parts.

One part is depth-guided weight:

$$W^*(d_{r_{st}}, d_f) = e^{-(d_f - d_{r_{st}})^2 / 2\sigma_d^2}$$

where $d_{r_{st}}$ is the ray's depth, and $d_f$ is the depth of focal plane to render. According to the function and the property of Gaussian function, the closer the ray's depth is to the $d_f$, the larger weight the ray will be assigned.

Another part is semantic weight:

$$W^*(s_{r_{st}}, d_f) = \max\left\{0, -\frac{(d_f - D_{min}^{st})(d_f - D_{max}^{st})}{((D_{max}^{st} - D_{min}^{st})/2)^2}\right\}$$

Where $D_{min}^{st}$ is the minimum depth of rays labeled $s_{r_{st}}$, and $D_{max}^{st}$ is the maximum one. Such function is based on the assumption that each object's weight conforms quadratic distribution.

Figure 1:
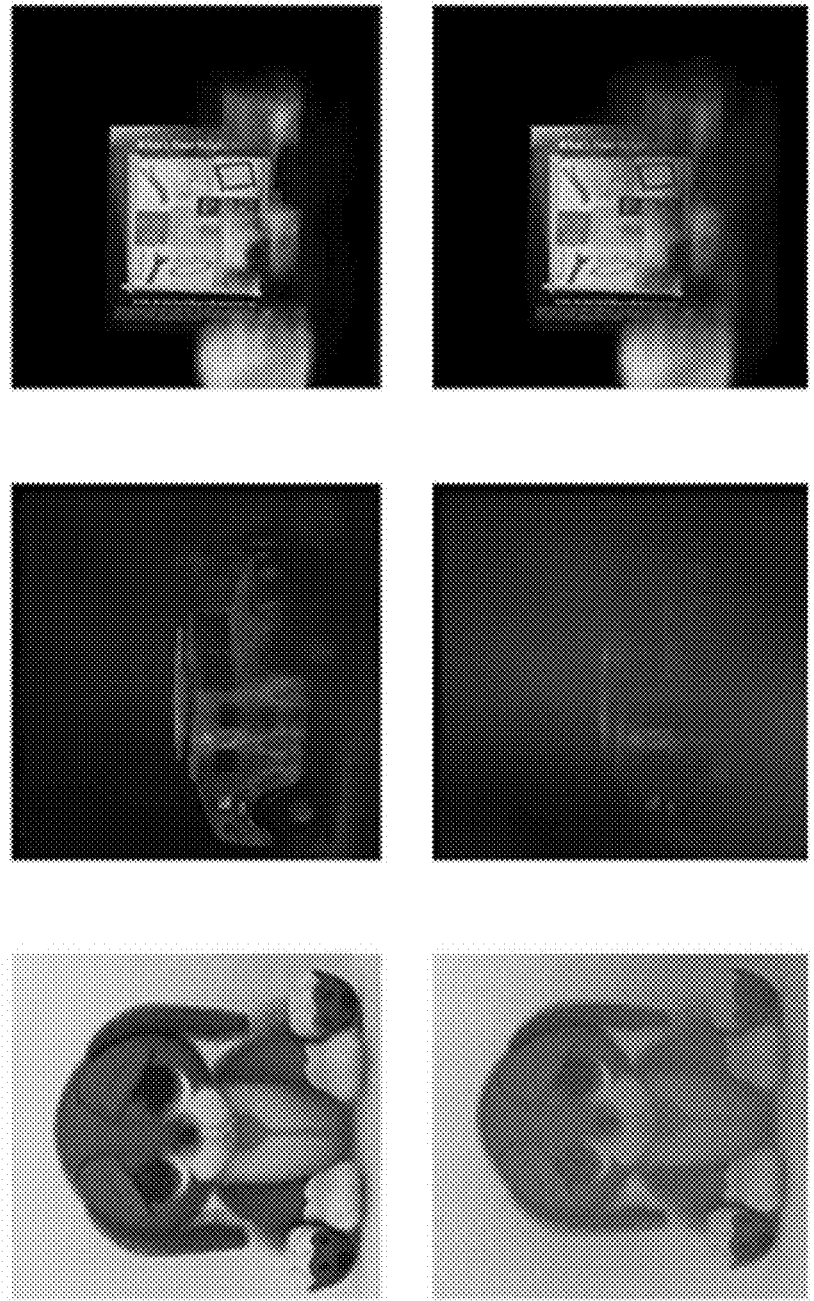
FIG. 1 illustrates comparison of the rendered images using both the prior light field rendering method and the image rendering method according to an embodiment of the present invention.

If we conduct light field rendering using such weight, we can get that strong capability of see-through as shown by FIG. 1. FIG. 1 shows comparison of the results of three light field rendering using our semantic light field rendering (top views) and the traditional rendering (bottom views).

Third, our semantic light field rendering needs each ray's depth information. There exists numerous depth recovery methods, but all the methods only recover the center view's depth. So in this work, we using other's method to get the center view's depth and using our own Semantics-consistent Depth Warping to propagate the center view's depth to the rest views.

Figure 2:
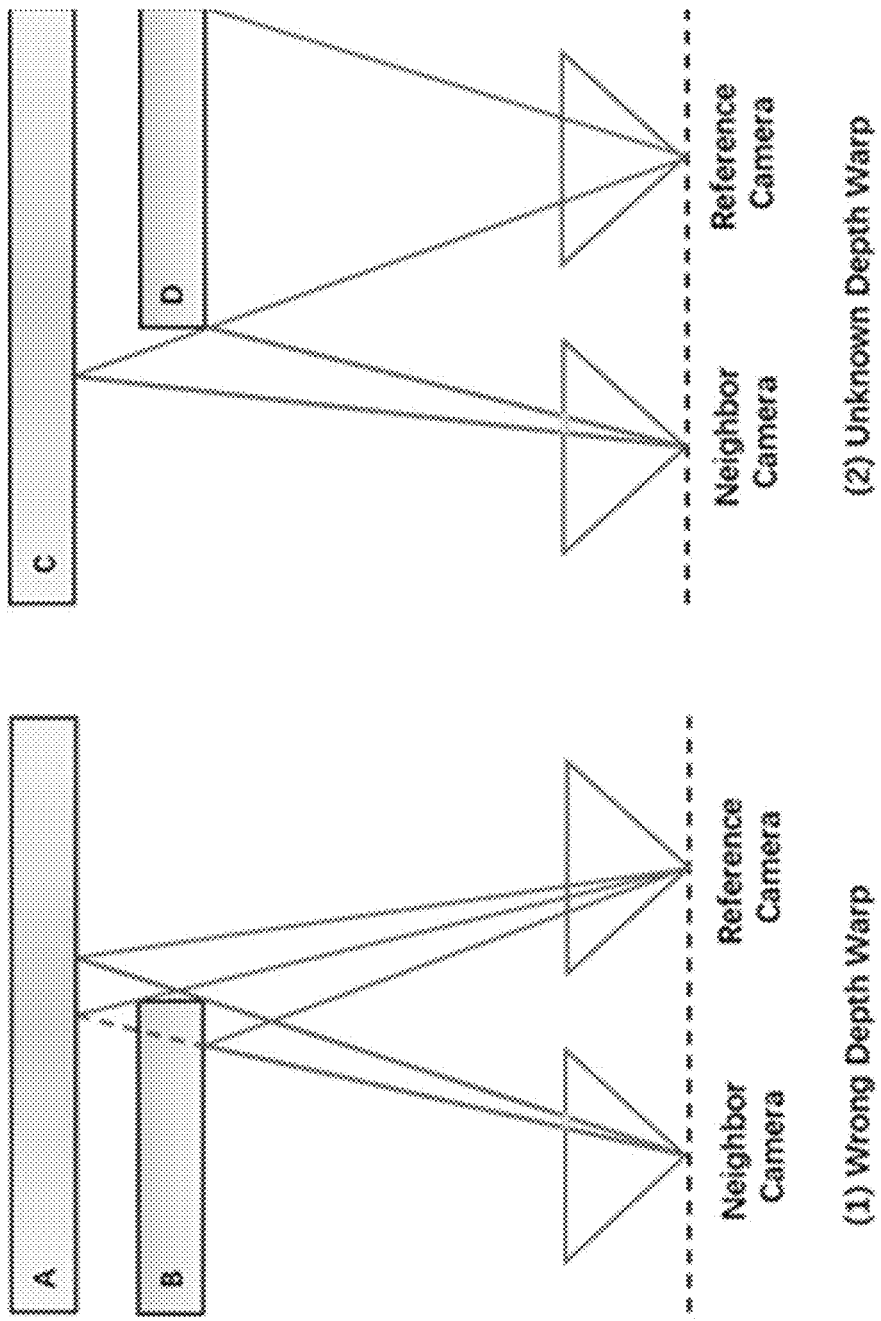
FIG. 2 illustrates depth warp problems that exist in traditional depth warping methods.

Our semantics-consistent depth warping can resolve the wrong depth warping and unknown depth warping problems that always occur in traditional depth warping. Such problems are explained by FIG. 2.

To solve the first problem, when given the center view disparity map (equivalent to depth map) M_d_sr_tr, we warp the map to view C(s, t) using the following equation:

$$M_d(s,t,u,v) = \min\{M_d(s_r,t_r,u_r,v_r) | u_r + M_d(s_r,t_r,u_r,v_r) \times (s_r - s) = u, v_r + M_d(s_r,t_r,u_r,v_r) \times (v_r - v) = v\}$$

Then we apply our depth warping method, the warped pixel points from the reference view have two appearance information, color and labeling. To keep the labeling consistency, we develop a label-based smooth method. We assume that every object appears at the reference view. That would still hold on the roughly propagated depth map.

Given a roughly propagated depth map $M_d(s,t)$ and its corresponding labeling map $M_l(s,t)$, let $\Omega_i^k$ be the set of pixels labeled as class i that have explicit depth value and $\Omega_i^u$ be those that have unknown depth value. For any p(u,v) belongs to $\Omega_i^u$, we introduce a n×n window centered at coordinate p(u,v), if we can find out in such window a pixels set $\Omega_i^u$ which are part of $\Omega_i^k$ and has more than $N_{thr}$ elements, then the depth value of p(u,v) becomes the average depth value of set $\Omega_i^n$. Otherwise, we recursively double the height and width of the window, until we are able to find a satisfied $\Omega_i^n$ or either the width or height of that window exceeds the size of $M_d(s,t)$, ultimately we set the depth value of p(u,v) to the average depth value of set $\Omega_t''$. This will get rid of the second problem of the traditional depth warp.

In addition, our semantic light field rendering needs depth maps. Depth information can be obtained through some device, such as Kinect, or using light field stereo matching algorithm to get the depth. It doesn't matter what kind of method are used to obtain the depth, but it is generally preferable that the depth map's error should be within 5% compared with the ground truth in mms.

Similarly, semantic segmentation maps can be acquired by different methods, but it is generally preferable that the semantic segmentation maps is that at least 90% area of a labeled object is true.

Figure 4:
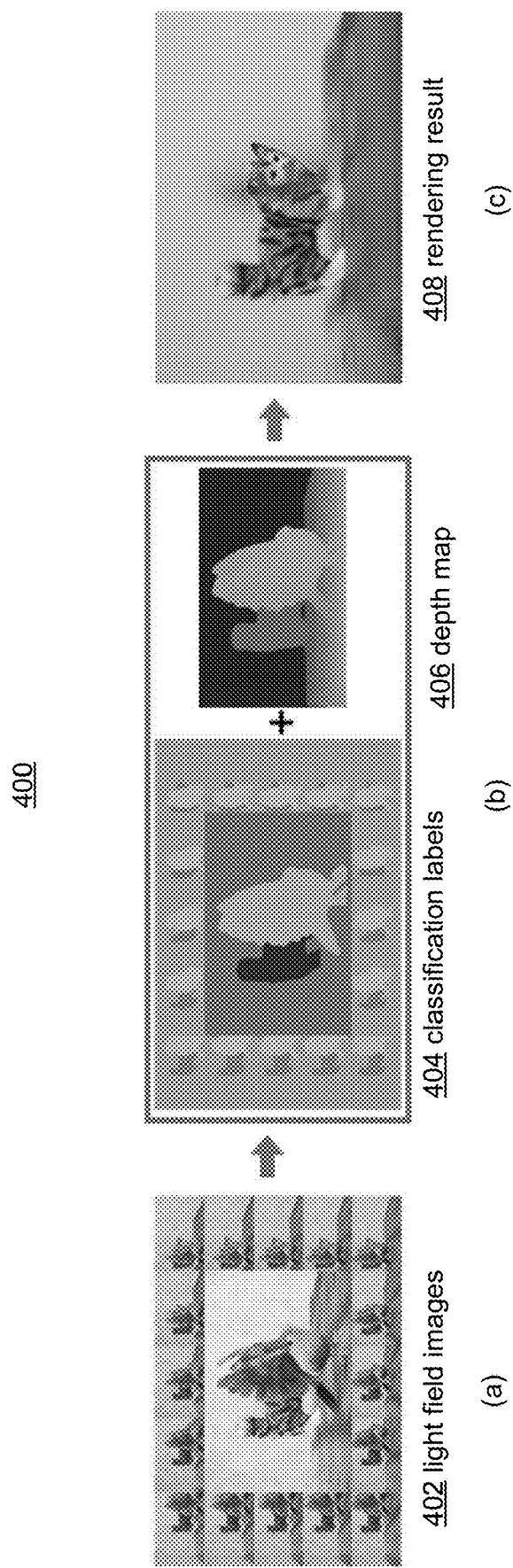
FIG. 4 illustrates an overview process of an image processing method according to an embodiment of the present invention.

FIG. 4 illustrates an overview process of an image processing method according to an embodiment of the present invention. The image processing method may also be referred to as semantic see-through light field rendering. FIG. 4 is intended to present the background and certain elements of embodiments of the invention at a very high level without requiring introducing specific terms or formulas.

Image (a) of FIG. 4 is the input of the imaging processing method, which is a set of images 402 called light field images. In the light field, a hen model and a cat model are placed on a table, where the hen model occludes the cat model to be focus on. The mathematical model and representation of light field are given below following the description of the image (a) of FIG. 4.

Image (b) of FIG. 4 includes the initial classification labels 404 assigned to each pixel of the light field images, obtained through deep learning. Image (b) of FIG. 4 also includes a depth map 406 (sometimes referred to as disparity map, a closely related concept, in the literature). In image (b) of FIG. 4, two classification labels are assigned, one for the hen model and the other for the cat model behind the hen model. The depth map indicates each pixel's distance in the field of view from the camera.

Image (c) of FIG. 4 is the rendering result 408 of the imaging processing method of the light field images in image (a) of FIG. 4. In image (c) of FIG. 4, most pixels of the hen model occluding the cat model have been removed or blurred, thereby creating a see-through effect in the rendered image for the light field.

Generally, a light field can be represented by a 5-D plenoptic function that can represent the intensity of the light observed from every position and direction in 3-dimensional space, also known as a ray. The dimension can be reduced if certain restriction or assumption is made to achieve efficiency and/or simplicity.

One common simplification is to represent the light field with a 4-D function by assuming that the light field is measured in free space where light ray radiance remains constant along a straight line. Such a representation of a 4-D light field then would parameterize the light rays by the coordinates of their intersections with two planes placed at arbitrary positions. The coordinate system is denoted by (u, v) for the first plane denoting a pixel coordinate in a respective camera and (s, t) for the second plane denoting a camera position, also known as focal plane and camera plane, respectively. An oriented light ray defined in this coordinate system first intersects the uv plane at coordinate (u, v) and then intersects the st plane at coordinate (s, t), and is thus denoted by L(u, v, s, t). Thus, the plenoptic function describing a light field is reduced from 5 to 4 dimensions, and parameterized by four coordinates (u, v, s, t). Similarly, each ray is parameterized by its intersections of the two parallel planes st and uv as a 4-tuple r=[u, v, s, t].

With the above representation, a 2-D image would be a two dimensional slice of the 4D light field and creating a light field from a set of images corresponds to inserting each 2D slice into the 4D light field representation. Similarly, generating new views corresponds to extracting and resampling a slice.

A more detailed reference for the light field representation and model is reported in M. Levoy, et al. *Light field rendering*, in Proc SIGGRAPH 1996, the entire contents of which are incorporated herein by reference.

In light field rendering, a unique rendering capability of light field is post-capture refocusing. Given a virtual focal plane $z=d_f$, it is well established that rays from a light field are resembled as if they emit from the focal plane as follows:

$$E(u', v') = \int\int L\left(s + \frac{u'-s}{d_f}, t + \frac{v'-t}{d_f}, s, t\right) A(s, t) ds dt \quad (1)$$

where E(u',v') is the irradiance image value that would have appeared on a synthetic film plane and A(s,t) represents the virtual aperture that controls the angular extent of rays to gather (e.g., one within the opening and zero outside it).

Implementation of light field rendering according to the above formula usually involves using different methods to numerically approximate this integral. The refocusing process can be accelerated in the frequency space, as reported in R. Ng, et al., *Light Field Photography with a Hand-held Plenoptic Camera*, 2005, Computer Science Technical Report CSTR 2005-02. More recent approaches further employed depth-guided ray interpolation to minimize visual artifacts such as aliasing (as reported in Y. Yang, et al., *Virtual DSLR: High Quality Dynamic Depth-of-Field Synthesis on Mobile Platforms*, in Proc IS&T International Symposium on Electronic Imaging 2016) and color bleeding (as reported in J. Fiss, et al., *Light Field Layer Matting*, in Proc IEEE Comput Soc Conf Comput Vis Pattern Recognit, June 2015, pp. 623-631), where the depth map can be acquired either by active 3D sensing (as reported in R. A. Newcombe, et al. *KinectFusion: Real-time dense surface mapping and tracking*, In Proc IEEE Int Sym Mix Augment, October 2011, pp. 127-136) or passive light field stereo matching (as reported in H. Jeon, et al. *Accurate Depth Map Estimation from a Lenslet Light Field Camera*, in Proc IEEE Comput Soc Conf Comput Vis Pattern Recognit, June 2015, pp. 1547-1555 and in S. Wanner, et al. *Globally consistent depth labeling of 4D light fields*, in Proc IEEE Comput Soc Conf Comput Vis Pattern Recognit, June 2012, pp. 41-48). The entire contents of the above references are incorporated herein by reference.

By setting the aperture really big (e.g., using a light field camera array), the refocusing effect can further mimic virtual see-through and can partially remove the foreground. However, with refocusing alone, even at a full aperture (i.e., using all cameras in a camera array), the rendering still exhibits substantial foreground residue.

This disclosure generally describes an image processing method according to an embodiment of the present invention. As summarized above, the image processing method, particularly a light field image rendering method, operates to create see-through effects in rendered images by removing occluding foreground and blurring uninterested objects in the light field.

In general, during a light field image rendering process, embodiments of the light field image rendering methods and systems may differentiate objects in the light field located at different depths of field, as well as objects belonging to distinct categories. For example, an object of interest and its background can be differentiated during the light field image rendering process, as well as two different categories like cars and pedestrians.

According to an embodiment of the present invention, an image processing method may provide information representing a light field. One example of such representation is a 4-D function with the above assumption that the light field is measured in free space where light ray radiance remains constant along a straight line. Such a 4-D function can be represented either by a function L(u, v, s, t) or sufficient number of samples of rays with parameters given as r=[u, v, s, t]. A person having ordinary skills in the art understands that the embodiments of the invention are not limited in any way to any specific representations used to implement any concepts of the invention. Generally speaking, as long as a representation of a light field is capable of being used to generate one or more images that either individually or collectively represent the light field, it would suffice for the purposes of making and using the invention.

According to an embodiment of the present invention, the image processing method may specify an object of interest in the light field or a focal depth to focus on for rendering. To specify an object of interest in the light field to focus on for rendering, it usually suffices to just provide the category or label name of the object of interest, such as car, bridge, office building. To specify a focal depth to focus on for rendering, the method may either choose a value of focal depth or a specific numeric range of focal depth for rendering.

According to an embodiment of the present invention, the image processing method may generate a rendered image for the light field based on the representation of the light field. The process of generating the rendered image for the light field based on the light field representation will be explained below in details. It would be useful to understand that the image processing method, and more specifically the process of generating the rendered image, differentiates objects in the light field located at different depths of field and differentiates objects in the light field belonging to distinct categories to focus on the object of interest and to create see-through effects. The differentiation may take various forms, as illustrated in different examples below.

In some embodiments, the image processing method may blur a background object behind the object of interest. The image processing method also may at least partially remove from the rendered image an occluding object that may prevent a viewer of the rendered image from viewing the object of interest. In some embodiments, the image processing method may further blur areas of the rendered image that represent an object in the light field other than the object of interest.

For example, in the rendered image of in image (c) of FIG. 4, the background wall behind the cat model has been blurred. In addition, the occluding hen model preventing a viewer from viewing the cat model of interest (as seen partially blocked in image (a) of FIG. 4), has been largely removed. Some areas other than the cat model which is the object of interest also appear blurred, for example, the portion of the table plane in front of the cat model.

In some embodiments, the light field may be represented by a 4-D function as described above, which may effectively define each oriented light ray of the light field. The rays may first intersect a first uv plane (i.e., the focal plane) at coordinate (u, v) and then intersect a second st plane (i.e., the camera plane) at coordinate (s, t), and may thus be parameterized by its intersections of the two parallel planes st and uv as a 4-tuple r=[u, v, s, t]. In other words, each ray may be defined by positions of its intersections with the focal plane and the camera plane. In some embodiments, each ray may correspond to a pixel in the rendered image. Where no ambiguity exists, the term ray and its corresponding pixel are used interchangeably throughout the specification.

A pixel of the rendered image may be rendered by resampling rays corresponding to the pixel. In some embodiments, the resampling process may be approximated by interpolating a function representing the light field with samples of pixels near the pixel to be rendered. A general description of rendering and resampling process is given in the Levoy reference.

FIG. 5 illustrates a flowchart 500 for rendering a light field according to an embodiment of the present invention. The process 500 may include Step 502 of constructing a weight function for the light field, which includes a depth component and a semantic component, where the weight function assigns a ray in the light field with a weight. The process 500 may include Step 504 of conducting light field rendering using the weight function.

In one embodiment, the depth component and the semantic component of the weight function respectively assigns a depth-guided weight and a label-guided weight to a ray, and a joint weight for the ray is calculated by multiplying the depth-guided weight and the label-guided weight. In one embodiment, the label-guided weight assigned to a ray further depends on a focal depth for rendering, wherein the label-guided weight is assigned a minimum weight when the focal depth is either less than a minimum depth value or greater than a maximum depth value.

FIG. 6 illustrates a flowchart 600 for generating a rendered image according to an embodiment of the present invention. Briefly speaking, the process 600 of generating a rendered image is performed in such a weighting scheme that rays emitting from objects of different categories are given different weights and rays emitting from objects at different depths are given different weights during rendering.

The process 600 may include Step 602 of calculating a depth value for each ray. The depth value represents a depth of field of a corresponding pixel in the rendered image.

The process 600 may include an optional Step 604 of assigning a classification label to each ray. Each classification label may correspond to one of the distinct categories that are previously known and used to train a neutral network. The trained neutral network is then used to process and classify different objects in the light field. In some embodiment, a ray assigned a same classification label with rays corresponding to the object of interest is given a higher rendering weight than a ray assigned a different classification label.

The process 600 may include Step 606 of rendering the plurality of rays in a weighting scheme. The weighting scheme in Step 606 would differentiate objects in the light field located at different depths of field. More particularly, the weighting scheme works in such a way that a ray having a same or close depth value with rays corresponding to pixels of the object of interest is given a higher rendering weight than any rays having a distinctively different depth value.

In particular, Step 606 may be performed by assigning, for each ray, a depth-guided weight and a label-guided weight and calculating a joint weight for each ray by multiplying the depth-guided weight and the label-guided weight. The depth-guided weights are assigned such that, the farther away a ray's depth is from a depth of field of the object of interest, the less value the ray's depth-guided weight is assigned. The assigned label-guided weights depend on each ray's assigned classification label.

In one embodiment, for each pixel, all rays corresponding to each pixel multiplied by their respective joint weights are combined. Accordingly, rendering of each pixel is performed based on the combined rays corresponding to each pixel.

The process 600 can be more readily understood with reference to the example in FIG. 4. The depth map of view 406 in image (b) of FIG. 4 is an example of Step 602. FIG. 4 do not show details of Step 604 about training a neutral network or use the trained neutral network to classify different objects in the light field. An exemplary result of classifying different objects of Step 604 is shown in view 404 where the hen model and the cat model are assigned different labels. Image (c) of FIG. 4 also shows an example of how rays with different labels are weighted differently in rendering. In image (c) of FIG. 4, the hen model is almost completely removed from the rendered image because its rays are given a very low weight in rendering, while the cat model remains and appears essentially unblocked as a result of its rays being given high weights in rendering.

FIG. 7 illustrates a flowchart 700 for calculating a depth value for each ray (i.e., Step 602) according to an embodiment of the present invention, including generating a disparity map of the rendered image that corresponding to Steps 702-706. The disparity map represents disparity information for each pixel of the rendered image indicative a difference between a pair of images taken by cameras at different locations.

A disparity map is a map consisting of disparity information for each pixel of an image. Given two images taken by cameras at different horizontal positions, disparity refers to the difference in horizontal location of an object in the left and right image. An object at position (x, y) in the left image appears at position (x−d, y) in the right image. If the disparity of an object is known, the object's depth z can be computed as follows: z=fB|d, where f is the focal length of the camera and B is the distance between the camera centers, also referred to as baseline. The details of the step of generating a disparity map will be described in details below with reference to Steps 702-706.

The process 700 may include Step 702 of training a convolutional neural network using a data set with similar and dissimilar pairs of images.

The process 700 may include Step 704 of applying the trained convolutional neural network to each image patch of the pair of images to obtain an initial matching cost for the each image patch.

The process 700 may include Step 706 of applying a stereo method to refine the matching cost for the each image patch and to determine a disparity value for the each image patch.

The process 700 may include Step 708 of determining the depth value for each ray based on the disparity map and a distance between centers of the cameras.

Specifically, in one embodiment, a learning-based convolutional neural network is used to first conduct pair-wise disparity map estimation. It is named MC-CNN and reported in J bontar et al., *Stereo matching by training a convolutional neural network to compare image patches*, J Mach Learn Res, 17 (2016), pp. 1-32, the entire contents of which are incorporated herein by reference. MC-CNN uses a convolutional neural network to initialize the stereo matching cost:

$$C(p,d)=-s(P^L(p),P^R(p-d)) \quad (2)$$

where $P^L(p)$ is a patch from left image, d is the disparity under consideration and $P^R(p-d)$ is a patch from right image. $s(P^L(p),P^R(p-d))$ is the output from the neural network which indicates the similarity between the two patches.

MC-CNN iteratively applies cross-based cost aggregation to average matching cost over a support region. It differs from averaging in a fixed window in that pixels in a support region belong to the same physical object. It then imposes smoothness on the disparity image by minimizing the following energy function in two horizontal and two vertical directions:

$$E(D)=\Sigma_p\{C(p,D(p))+\Sigma_{q\in N_p}P_1\cdot 1(|D(p)-D(q)|=1)+ \Sigma_{q\in N_p}P_2\cdot 1(|D(p)-D(q)|>1)\}, \quad (3)$$

where $1(\bullet)$ is the indicator function, $P_1$ and $P_2$ are smoothness penalties.

After sub-pixel enhancement, MC-CNN finally refines the disparity map by introducing a 5×5 median filter and the following bilateral filter:

$$D_{Final}(p) = \frac{1}{M}\sum_{q\in N_p} D(q)\cdot g(\|p-q\|)\cdot 1(|I(p)-I(q)|) < \epsilon_I \quad (4)$$

where g(x) is the standard normal distribution, $\epsilon_I$ is the intensity blurring threshold and M is the normalizing constant.

The generated disparity map from a pair of images may contain holes, especially on the left margin of the left image and the right margin of the right image. Given that a light field is composed of a number of rectified image pairs, there are sufficient number of disparity maps to patch in the holes by warping and interpolating individual disparity map.

Let $D^R$ denote the reference disparity map to patch the holes. Let $\{D^{L_1},D^{L_2}\}$ denote the left two disparity maps of the reference disparity map. An incorrect disparity pixel in $D^R$ represents inconsistency between $D^R$ and $D^L$. Therefore, each disparity d in $D^R$ is labeled by performing the following consistency check on $D^R$ and $D^L$:

$$\text{label} = \begin{cases} \text{correct} & \text{if } |d - D^{L_1}(p+d)| \leq 1 \text{ or} \\ & |d - D^{L_2}(p+2d)| \leq 1 \text{ for } d = D^R(p) \\ \text{mismatch} & \text{if } |d - D^{L_1}(p+d)| \leq 1 \text{ or} \\ & |d - D^{L_2}(p+2d)| \leq 1 \text{ for any other } d \\ \text{occlusion} & \text{otherwise} \end{cases} \quad (5)$$

For position p marked as occlusion, a linear right search in $D^{L_1}$ may be performed until a correct position p' is found that satisfies p'−$D^{L_1}$(p')=p. If the search fails, a further search in $D^{L_2}$ may be performed until a correct position p" is found that satisfies p"−$D^{L_2}$(p")=p. For position marked as mismatch, the nearest correct pixels in 16 different directions are found and the median of their disparities is used for interpolation. The left margins in each view are also considered as occlusions and a linear search is also performed as above.

FIG. 8 illustrates a flowchart 800 for assigning to each ray a classification label (i.e., Step 604) according to an embodiment of the present invention. The classification labels are usually known so the process of assigning a classification label is a typical classification problem in machine learning. Such tasks are also referred to in the literature and sometimes in the specification and as scene parsing, semantic segmentation, semantic labeling, etc.

The process 800 may include Step 802 of computing a probability distribution for each pixel of the rendered image using a convolutional neural network. The probability distribution for each pixel comprises probabilities that the pixel belongs to each one of the distinct categories, respectively. The higher a probability is for a classification label, the more likely that such a classification label will be assigned to the pixel than another classification label having a lower probability. In one embodiment, the convolutional neural network used to compute the probability distribution is a neural network called pyramid scene parsing network that is reported to have achieved strong results, as described in details below.

The process 800 may include Step 804 of calculating a confidence score for each pixel's probability distribution. The purpose of calculating a confidence score is to compare the calculated confidence score with a threshold value to decide whether a pixel's probability distribution has the sufficient confidence or the classification label prediction of such a pixel should be deemed unreliable and be discarded.

The process 800 may include Step 806 of determining that a pixel's probability distribution is unreliable when the calculated confidence score for the pixel's probability distribution is below a threshold and specifying any rays that correspond to the pixel as unlabeled. The choice of the threshold is a balance between the precision and recall of label classification, as described in more details below. In one embodiment, rays specified as unlabeled are recalculated for classification label assignment based on depth values of these rays. In one embodiment, rays that correspond to distinct objects that are separate in depth of field are also recalculated for classification label assignment based on depth values of these rays.

The process 800 may include Step 808 of assigning, for each of remaining pixels whose probability distribution is not determined to be unreliable, a classification label having a highest probability among the probability distribution to all rays corresponding to the each one of the remaining pixels.

In one embodiment, the convolutional neural network used to compute a probability distribution for each pixel of the rendered image is called pyramid scene parsing network (PSPNet), reported in H. Zhao et al., *Pyramid Scene Parsing Network*, in Proc IEEE Comput Soc Conf Comput Vis Pattern Recognit, July 2017, pp. 6230-6239, the entire contents of which are incorporated herein by reference.

The PSPNet first computes a convolutional feature map based on a deep neural network called residual network (ResNet). To encode spatial context information, the network adopts a pyramid feature pooling strategy that generates a four-level feature map representing global and sub-regional contexts. The pooled context feature maps are then upsampled and concatenated with the original feature map as inputs to predicting a multi-class label distribution for each pixel. The final semantic labeling can be generated by taking the most-probable label configuration for the entire image.

Figure 10:
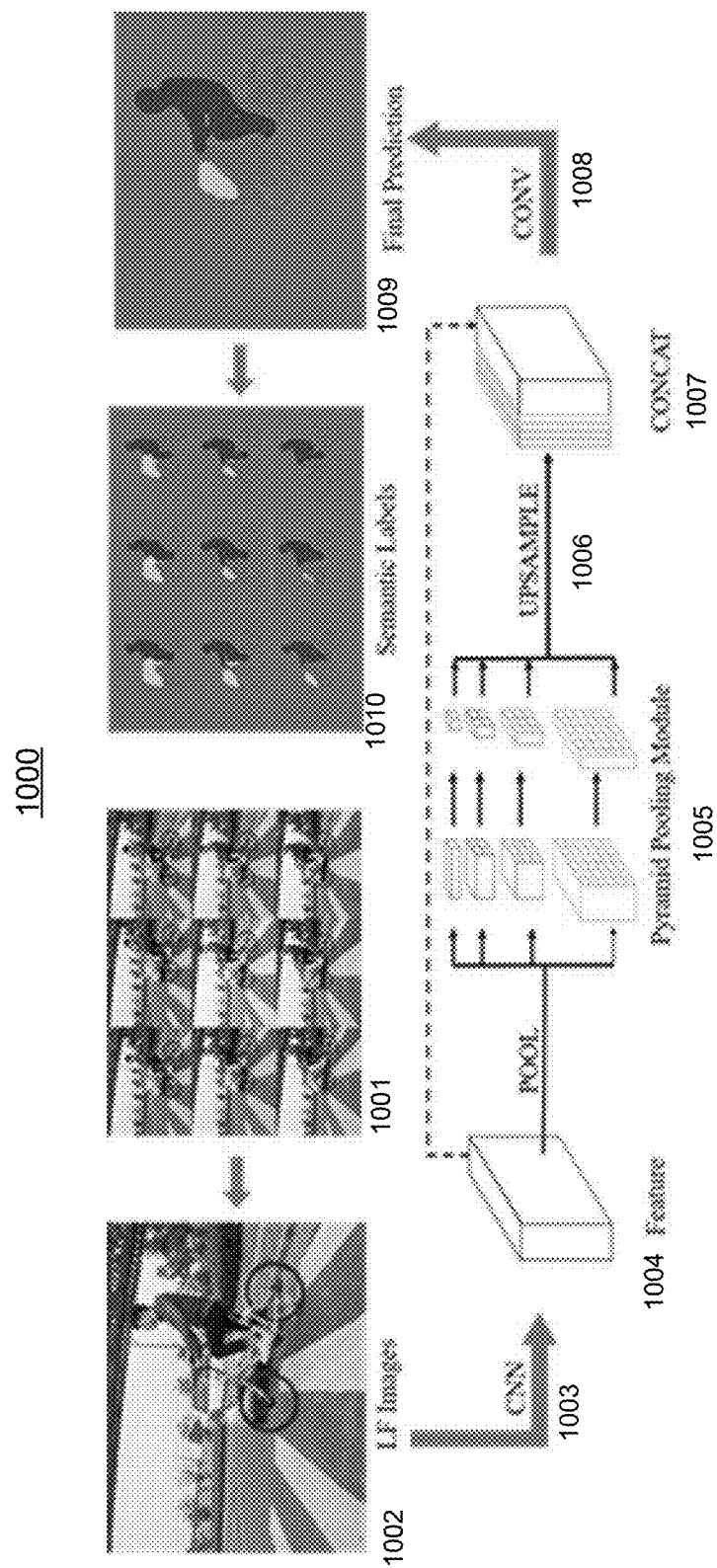
FIG. 10 illustrates a neural network called pyramid scene parsing network (PSPNet) used in an embodiment of the invention.

The model configuration is illustrated in FIG. 10, which provides an overview 1000 of the PSPNet as applied in embodiments of the invention. Given an input image 1002 from the light field images 1001, the PSPNet first uses a convolutional neural network (CNN) 1003 to obtain the feature map 1004 of the last convolutional layer of the CNN. Then a pyramid parsing module 1005 is applied to harvest different sub-region representations, followed by upsampling 1006 and concatenation layers 1007 to form the final feature representation, which carries both local and global context information in the pyramid parsing module. Finally, the representation is fed into a convolution layer 1008 to get the final per-pixel prediction 1009. The semantic (i.e., classification) labels 1010 for each light field images can be derived accordingly.

Formally, in one embodiment, the classification label space is denoted as $C=\{1, \ldots, C\}$ where C is the number of semantic classes. At each pixel $x_i$, which corresponds to a visual ray [u, v, s, t], the PSPNet computes a label distribution $p(y_i)$ where $y_i \in C$. By taking the MAP estimates as $y_i^* = \arg\max p(y_i)$, the pixel-wise labeling is generated.

In one embodiment, given the outputs of the PSPNet, the next step is to estimate a confidence score for each pixel's label prediction. It is observed that the marginal label distribution $p(y_i)$ tends to be more divergent in complex areas, e.g., near the boundary of an object, and more concentrated within an object region. Therefore a high confidence semantic map in terms of the entropy of the label distribution is computed as follows, $$H(x_i) = -\Sigma_{y_i \in C} p(y_i) \log p(y_i) \tag{6}$$

The label distribution at each pixel reaches the maximum entropy when each label value shares the same probability, and reaches the minimum when it takes a single label value with probability 1. A large entropy generally indicates that one would not be confident at that pixel due to diverse label probabilities.

In one embodiment, given the high confidence semantic map, a simple thresholding strategy is used to filter out pixels with unreliable label predictions. Specifically, the initial semantic label prediction $y_i^*$ is considered confident if the following condition holds:

$$H(x_i) = -\Sigma_{y_i \in C} P(y_i) \log p(y_i) < \epsilon_H \tag{7}$$

where $\epsilon_H$ is a model parameter controlling the balance between the precision and recall of the remaining pixel labeling. A larger $\epsilon_H$ usually indicates low accuracy but high coverage and vice versa. Therefore, a balance between accuracy and coverage can be achieved by adjusting a selection of $\epsilon_H$. By applying the confidence-based thresholding, a large amount of unreliable classification label predictions can be removed to improve the classification label assignment.

In one embodiment, to estimate the parameter $\epsilon_H$, a score function is introduced based on the quality of the label predictions satisfying the above condition. Denote the remaining pixel set as $S_\epsilon$, the semantic label map $Y_{S_\epsilon}^*$ is used to estimate its accuracy $$Acc = \frac{TP}{TP+FP}$$

(eliminating background label) and coverage $$Cvg = \frac{TP}{TP+FN}$$

(eliminating background label), where TP stands for true positive, FP for false positive, and FN for false negative. (To calculate Acc and Cvg one view is manually labeled.) As mentioned above, a larger $\epsilon_H$ usually indicates low accuracy but high coverage and vice versa. To achieve a balance between accuracy and coverage, $\epsilon_H$ is estimated by maximizing the following score function:

$$\text{Score} = \text{Acc}^m \cdot \text{Cvg} \tag{8}$$

where m is a hyper-parameter indicating the importance of accuracy over coverage. A higher m tends to output more accurate semantic map. In one embodiment, m is chosen to be equal to 4.

The process 800 may include an optional Step 810 of recalculating classification label assignments for rays that correspond to distinct objects that are separate in depth of field and rays specified as unlabeled based on depth values of these rays. The details of Step 810 are given below in the flowchart 900 in FIG. 9.

FIG. 9 illustrates a flowchart 900 for recalculating classification label assignments based on depth values (i.e., Step 810) according to an embodiment of the present invention.

Figure 12:
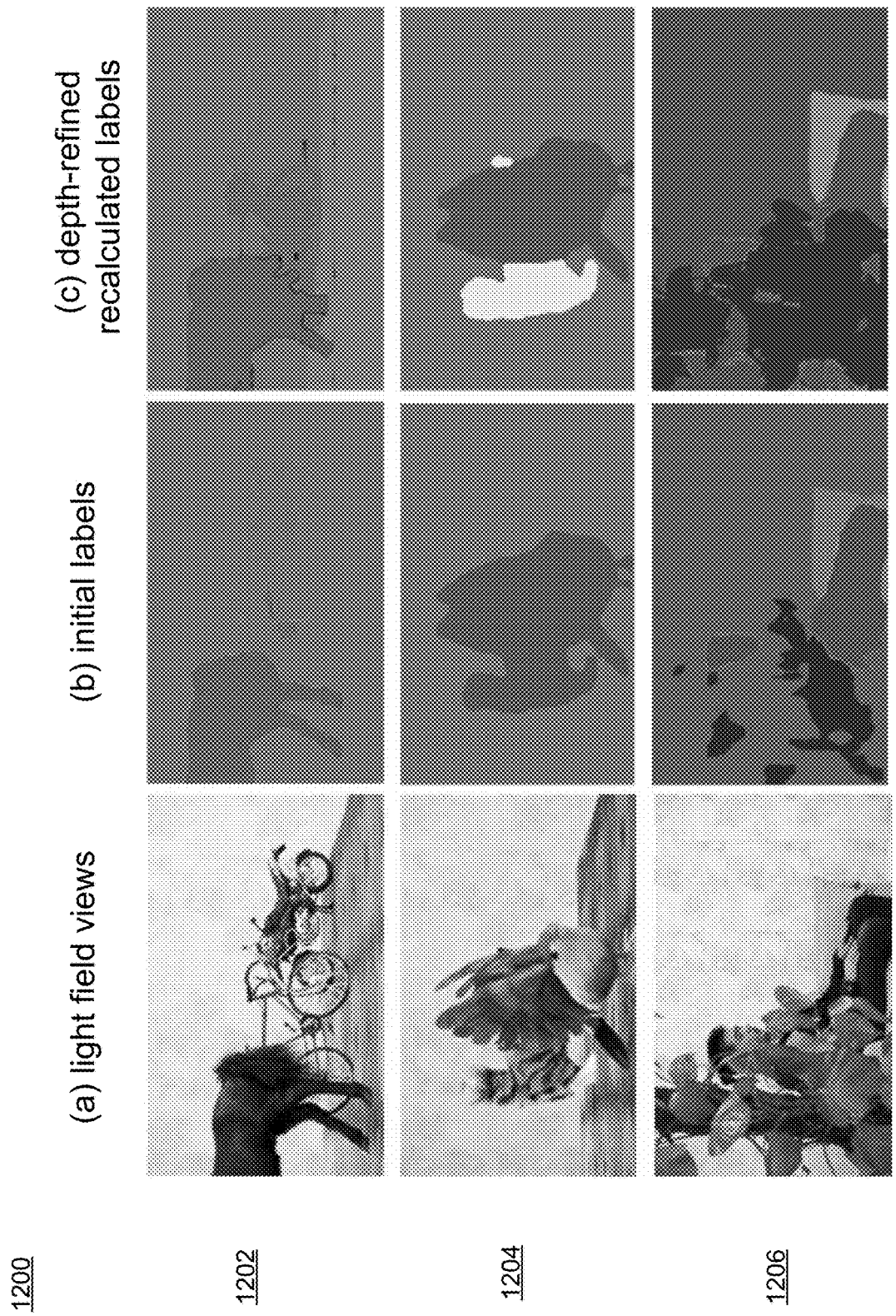
FIG. 12 illustrates examples comparing results of classification label assignment according to an embodiment of the present invention.

As mentioned in Step 810, the recalculation for classification label assignment are for two parts of rays. First part is the rays that are assigned as unlabeled. As described in Steps 804 and 806, a confidence score for each pixel's probability distribution is calculated and, when it is determined that the probability distribution is not sufficiently reliable, all the rays that correspond to the pixel are assigned as unlabeled. Second part is the rays that correspond to two different objects that have different depth values. As shown in FIG. 12 (the second example, view (b) of row 1204), two occluding objects have been incorrectly assigned one label. Since the rays corresponding to pixels of the two occluding objects have different depth values, it would be possible to label them correctly with the additional depth information of these rays.

Figure 11:
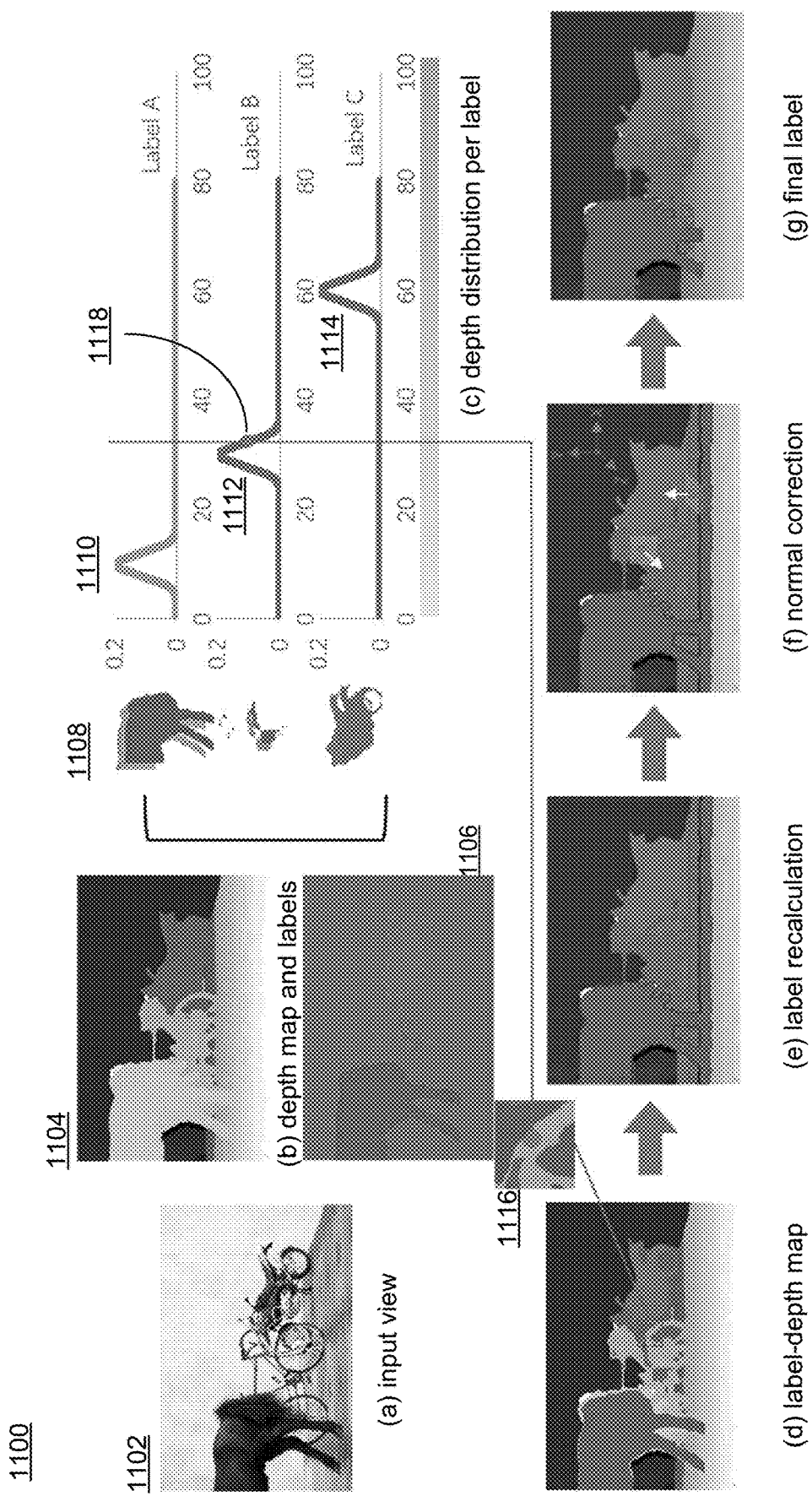
FIG. 11 illustrates an example of the recalculation process of FIG. 9 according to an embodiment of the present invention.

Referring now to FIG. 11, an example process of recalculation of classification label assignment refined and guided with depth information is shown. Image (a) of FIG. 11 is an illustrative input view 1102 of three different objects placed on a table at different positions. From the nearest to the farthest, they are a toy horse, a bicycle model, and a motorcycle model and have different depths of field from the perspective of the viewer.

Image (b) of FIG. 11 shows the depth map 1104 and labels 1106 (also referred to as the high confidence semantic map), which are the example processing results of the above described Steps 602 and 604 and flowcharts 700, 800, and 900, respectively. Specifically, the top view of image (b) of FIG. 11 is the depth map 1104 as the result of flowchart 700 where the smaller the depth value of a pixel, the lighter of the pixel in the depth map. The bottom view of image (b) of FIG. 11 is the classification labels 1106, also referred to as high confidence semantic map. As can be seen, most of the pixels are in grey color which means that they are assigned as unlabeled. This is because the pixels of those areas in the high confidence semantic map have a relatively low confidence score (calculated in Step 804) for their probability distribution. Notably, because both the bicycle model and the motorcycle model are partially occluded by the toy horse and the bicycle model, respectively, those pixels might have lower confidence scores so most of them are assigned as unlabeled as a result of Step 806.

Given the depth map and the high confidence semantic map, for each label, the recalculation process first models a distribution of its depth values, as shown in image (c) of FIG. 11. In image (c) of FIG. 11, for each of Labels A, B, and C that represent the toy horse, the bicycle model, and the motorcycle model (1108), respectively, a probability distribution is modeled by fitting a normal distribution with the depth values of the pixels that are assigned the respective classification label. Specifically, the pixels of the toy horse labeled in purple 1110 have a depth distribution from 0 to 20, those of the bicycle model labeled in green 1112 from 20 to 40, and those of the motorcycle model labeled in cyan 1114 from 50 to 70.

Then, for each of the unlabeled pixels, given its depth value, those normal distributions of all classification labels are used to query the probability of the pixel belonging each of the classification labels and to determine an optimal label for the pixel by choosing the one whose distribution yields a highest probability.

For example, as shown in the label-depth map of image (d) of FIG. 11, a pixel that would be labeled as bicycle model in a ground truth classification label map is unlabeled in the high confidence semantic map 1116. Given its depth value, by querying the depth value into each of the fitted probability distributions corresponding to the toy horse, the bicycle model, and the motorcycle model, respectively, it is fairly easy to determine (as indicated by 1118) that it belongs to the bicycle.

Image (e) of FIG. 11 shows the result of the recalculating classification labels for all unlabeled pixels. As shown, all pixels having depth values that are within the range of depth values of a classification label are assigned the classification label. Particularly, almost all the pixels of the bicycle model have been assigned the correct classification label, in contrast to the result from the high confidence semantic map in image (b) of FIG. 11. The classification label assignment for the pixels of the motorcycle model is also significantly improved.

Note that in image (e) of FIG. 11 a portion of the ground plane has also been assigned a same classification label with an object having a same depth value with the portion of the ground plane. For example, a bottom strip of the table plane is also labeled as the toy horse because the pixels of the bottom trip of the table have depth values that fall within the distribution of depth values for the toy horse label. Likewise, the middle strip of the table plane is labeled as the bicycle model and the bottom as the motorcycle model.

Image (f) of FIG. 11 shows a normal correction process to remove the above outliers (i.e., the strips of the table plane) caused by the ground plane via normal comparison by assigning pixels belonging to a ground plane as unlabeled. Image (g) of FIG. 11 shows the final classification label assignment.

Referring back to FIG. 9, the process 900 may include Step 902 of, for each classification label assigned to the pixels other than the unlabeled ones due to insufficient confidence score, creating a probability distribution function for each classification label. As described above with reference to image (c) of FIG. 11, it is performed by fitting a normal distribution with the depth values of all rays to which the each classification label is assigned. Image (c) of FIG. 11 shows all three normal distributions fitted with the depth values of pixels/rays labeled as toy horse, bicycle model, and motorcycle model, respectively.

The process 900 and Step 810 of recalculating classification label assignments can also be used to separate two occluding objects that are close to each other but separate in depths of field. In some cases, the classification process fails to correctly label them separately because they may very much appear as one object. Since the recalculation is based on depth values, it is possible to also correct this type of failure by the process 800. An example is given in FIG. 12 and described below.

The process 900 may include Step 904 of determining, for each pixel corresponding to unlabeled rays and each of the remaining pixels, a classification label whose probability distribution function value with respect to a depth value for the each pixel is highest among other classification labels. As described in image (d) of FIG. 11, given the depth value of an unlabeled pixel as input, the probabilities of the unlabeled pixel belonging to each of the toy horse, bicycle model, and motorcycle model labels can be calculated with the respective normal distribution fitted in image (c) of FIG. 11 and the classification label having the highest probability can be determined.

After the classification having the highest probability is determined, the process 900 may include Step 906 of assigning the classification label to rays corresponding to the each pixel.

As described above with reference to image (f) of FIG. 11, the process 900 may include Step 908 of assigning pixels belonging to a ground plane as unlabeled, wherein a portion of the ground plane has been assigned a same classification label with an object having a same depth value with the portion of the ground plane.

FIG. 12 illustrates three examples comparing results of classification label assignment according to an embodiment of the present invention. Each example (i.e., each of rows 1202, 1204, and 1206) includes a set of three images, shown in columns (a)-(c). Images in column (a) are light field images to be rendered. Images in column (b) are the initial classification label assignment as the results of Steps 802-808. Images in column (c) are the depth-refined/recalculated classification label assignment as the results of Step 810/flowchart 900.

The first example, illustrated by the set of three images in row 1202, has been already described and explained with reference to images (a), (b), and (g) of FIG. 11. FIG. 12 highlights that, in the first example, the high confidence semantic map (i.e., the result of Steps 802-808) fails to adequately or accurately label the bicycle model and the motorcycle model when they are occluded by other objects. The result of classification label assignment in 1202 (c), after refined by the flowchart 900 with each ray/pixel's depth information, is notably improved.

The second example, illustrated by the set of three images in row 1204, shows how the process 900 correctly labels two occluding objects appearing close to each other but separate in depths of field. In the view (a) of row 1204, a cat model which is to be focused on in rendering is behind and occluded by a hen model. The view (b) shows that the Step 802-808 fails to correctly label them separately because they appear as one object. The view (c) shows that Step 810/flowchart 900 managed to correctly label the pixels of the cat model with yellow and those of the hen model with red by using the depth information of the objects that are separate in depths of field.

The third example, illustrated by the set of three images in row 1206, shows another example of how the process 900 improves classification label assignment for occluding objects that are separate in depths of field. In the view (a) of row 1206, a man sits on a sofa behind the heavily foliaged bush which extremely occludes him. Two pillows are located to his left in the sofa. The view (b) shows that the Steps 802-808 fail to correctly label most pixels of the bush that appears close to and occludes the person sitting behind the bush. The view (c) shows that Step 810/flowchart 900 significantly improves the labeling of the bush by essentially using the depth information of the bush and the man that are separate in depths of field.

Figure 13:
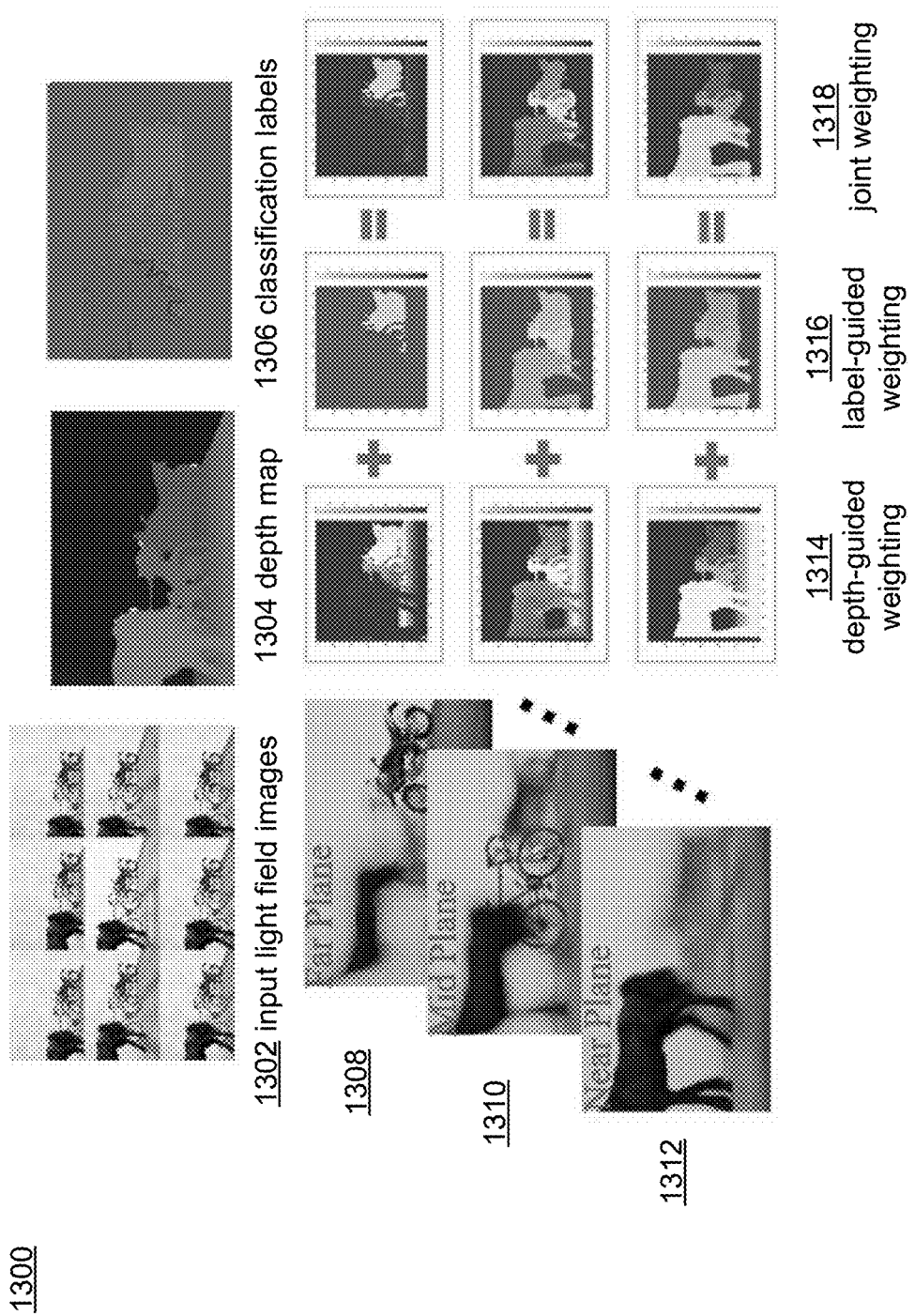
FIG. 13 illustrates an overview and examples for rendering a plurality of rays in a weighting scheme according to an embodiment of the present invention.

FIG. 13 illustrates an overview and examples for rendering the plurality of rays in a weighting scheme according to an embodiment of the present invention. The views of input light field images (1302), depth map (1304), and classification labels (1306) have been shown and/or described with reference to image (a) of FIG. 4 and images (b) and (g) of FIG. 11, respectively. In brief words, FIG. 13 shows using the depth map 1304 generated from Step 602/flowchart 700 and the classification labels 1306 generated from Step 604/flowcharts 800/900 to perform the step of rendering the rays in a weighting scheme as described in Step 606.

Particularly, FIG. 13 shows light field rendering in the weighted scheme at three focal planes, i.e., the far plane (1308) focusing on the motorcycle model, the middle plane (1310) focusing on the bicycle model, and the near plane (1312) focusing on the toy horse. For each focal plane, the illustrative rendering effects are provided in terms of assigned weights to rays for rendering under the depth-guide weighting (1314), the label-guided weighting (1316), and the joint weighting (1318) combining the depth-guide weighting and the label-guided weighting (in one embodiment, by multiplying the two weights).

Referring back to FIG. 6, and in particular to Step 606, in one embodiment, a ray's depth-guided weight is assigned as follows:

$$W(d_{r_{st}}, d_f) = (1 - C_1)W^*(d_{r_{st}}, d_f) + C_1, \qquad (9)$$

where $$W^*(d_{r_{st}}, d_f) = e^{-(d_f - d_{r_{st}})^2 / 2\sigma_d^2}, \qquad (10)$$

$d_{r_{st}}$ is the depth value of the ray, $d_f$ is the focal depth, $\sigma_d$ is a standard deviation that controls how many rays are impactive for rendering, and $C_1$ is a first fading factor that is between 0 and 1.

In the above embodiment, the depth-guided weights are assigned such that when a ray's depth coincides with the focal plane, i.e., $d_{r_{st}} = d_f$, the ray is in focus and will be assigned a full depth-guided weight. On the other hand, when a ray's depth is away from the focal plane, the ray is out of focus and will be assigned a smaller depth-guided weight, depending on how far the ray's depth is away from the focal plane.

The fading factor $C_1$ is introduced so that the range of a ray's depth-guided weight is between $C_1$ and 1, instead of between 0 and 1 otherwise. As $C_1$ decreases, objects away from the focal depth get more impactive. By setting different values to $C_1$, the rendering method can achieve different see-through effects. It is also to avoid the situation when $|d_f - d_{r_{st}}| > 3\sigma_d$, meaning that the ray's depth is rather far away from the focal plane, the assigned depth-guided weight would be extremely small and very close to zero, which yields undesirable rendering effect that some objects are almost invisible. Instead, with the fading factor $C_1$, the assigned depth-guided weight for rays that are far away from the focal plane would be always greater than $C_1$ and is never too close to zero.

In one embodiment, the label-guided weights are calculated as follows:

$$W(s_{r_{st}}, d_f) = (1 - C_2)W^*(s_{r_{st}}, d_f) + C_2, \qquad (11)$$

$$\text{where } W^*(s_{r_{st}}, d_f) = \max\left\{0, -\frac{(d_f - D^{st}_{min})(d_f - D^{st}_{max})}{((D^{st}_{max} - D^{st}_{min})/2)^2}\right\}, \quad (12)$$

$s_{r_{st}}$ represents the classification label for a ray $r_{st}$,
$d_f$ is the focal depth,
$D^{st}_{min} = \min\{d_r: s_r = s_{r_{st}}\}$ is the minimum depth among depths of all rays which the classification label $s_{r_{st}}$ is assigned to,
$D^{st}_{max} = \max\{d_r: s_r = s_{r_{st}}\}$ is the maximum depth among depths of all rays which the classification label $s_{r_{st}}$ is assigned to, and $C_2$ is a second fading factor that is between 0 and 1 and determines the minimum weight.

The above equations (11) and (12) for assigning label-guided weights can be understood as follows, according to one embodiment. In summary, the label-guided weight assigned to a ray further depends on the focal depth specified for rendering. When the focal depth is either less than a minimum depth value or greater than a maximum depth value, the label-guided weight is assigned a minimum weight, which is the second fading factor, $C_2$. Similar with $C_1$, the minimum weight threshold $C_2$ is introduced so that rays do not get dark when the focal plane depth is out of their depth range. The minimum and maximum depth values define the depth range of all rays that has the same label with $r_{st}$. Specifically, according to Eq. (12), the minimum depth value is the minimum depth among depths of all rays which the classification label is assigned to, and the maximum depth value is the maximum depth among depths of all rays which the classification label is assigned to.

In other words, a ray's label-guided weight depends on the position of the focal plane relative to the range of depths of all rays that are assigned the same classification label as the ray under consideration. If the focal plane falls outside of the above range of depths (i.e., either less than the above minimum depth value or greater than the above maximum depth value), a minimum weight $C_2$ is assigned as the ray's label-guided weight. Otherwise, a value greater than $C_2$ and less than 1 is assigned as the ray's label-guided weight, depending on the relative position of the focal plane within the range of depths of all rays that are assigned the same classification label.

Once a label and depth value have been assigned to each ray in the light field, a joint weight for the each ray can be calculated by multiplying the depth-guided weight and the label-guided weight:

$$W(s_r, d_r, d_f) = W(d_{r_{st}}, d_f) \cdot W(s_{r_{st}}, d_f) \quad (13)$$

A normalized joint weight can then be calculated by normalizing the above joint weight over st:

$$W_{norm}(s_r, d_r, d_f) = \frac{W(s_r, d_r, d_f)}{\iint W(d_{r_{st}}, d_f) \cdot W(s_{r_{st}}, d_f) ds dt} \quad (14)$$

Finally, rendering of light field images in a weighting scheme as described in Step 606 can be performed according to Eq. (1) as discussed above, by adding the normalized weighting function to the traditional light field rendering formula:

$$E^*(u', v') = \quad (15)$$
$$\iint W_{norm}(s_r, d_r, d_f) \cdot L\left(s + \frac{u' - s}{d_f}, t + \frac{v' - t}{d_f}, s, t\right) A(s, t) ds dt$$

$$\text{where } r = \left[s + \frac{u' - s}{d_f}, t + \frac{v' - t}{d_f}, s, t\right], \quad (16)$$

$W_{norm}(s_r, d_r, d_f)$ is the normalized weighting function of both the classification label $S_r$ and depth $d_r$ of ray r, as defined and described above.

A complete algorithm is given below.
Algorithm: Real-Time Semantic Light Field Rendering
Require: Light field L (u, v, s, t); Depth map D (s, t); Classification label map S(s, t).
1: for all pixel (x, y) on desired image plane do
2: p:=the pixel under consideration
3: q:=the intersection of $\overrightarrow{O_r p}$ with focal plane
4: $W_{sum}$:=0
5: c(x, y):=BLACK
6: for all reference camera (s, t) in aperture do
7: r:=the ray through q and O(s, t)
8: (u, v):=projection of q onto the image plane of (s, t)
9: Compute $W_{depth}$ using Eq. 9
10: Compute $W_{label}$ using Eq. 11
11: $W_{sum}$:=$W_{depth} \cdot W_{label}$
12: $W_{sum}$:=$W_{sum}$+W
13: c(x, y):=c(x, y)+W·L (u, v, s, t)
14: end for
15: c(x, y):=c(x, y)/$W_{sum}$
16: end for FIGS. 14*a*-14*d*, 15*a*-15*c*, 16*a*-16*d*, and 17*a*-17*c* show different examples of light field rendering according to an embodiment of the present invention.

Figure 14:
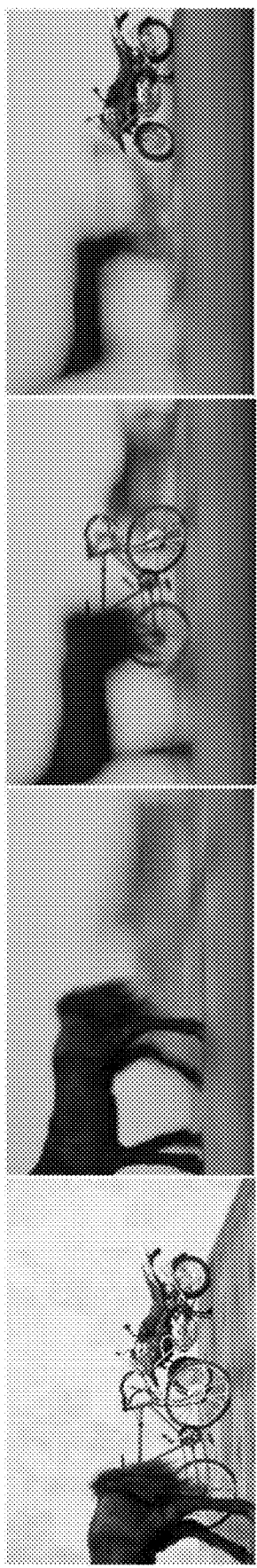
FIGS. 14, 15, 16, and 17 show different examples of light field rendering according to an embodiment of the present invention.

Images (a), (b), (c), and (d) of FIG. 14 have been used in FIG. 13 to illustrate the overview of rendering rays in a weighting scheme. Here, images (a), (b), (c), and (d) of FIG. 14 show the effects of semantic see-through rendering at different focal planes. Image (a) of FIG. 14 is the input view including a toy horse, a bicycle, and a motorcycle placed on a table. Image (b) of FIG. 14 is a semantic see-through rendering at a near plane as focal plane, i.e., focusing on the toy horse. Image (c) of FIG. 14 is a semantic see-through rendering at a middle plane as focal plane, i.e., focusing on the bicycle model. Image (d) of FIG. 14 is a semantic see-through rendering at a far plane as focal plane, i.e., focusing on the motorcycle model.

Figure 15:
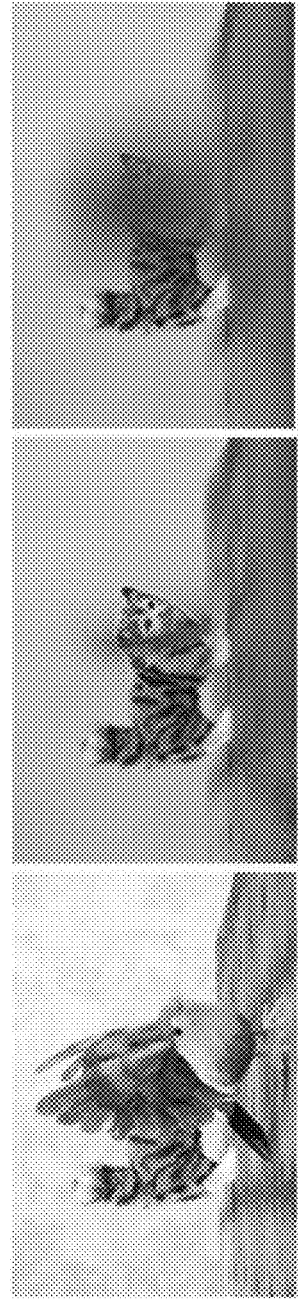

Images (a), (b), and (c) of FIG. 15 show and compare the rendering effects of the semantic see-through rendering and the regular refocusing of one of the light field examples described above. Image (a) of FIG. 15 is the input view including a hen model and a cat model placed on a table, where the hen model is positioned in front of and occludes the cat model. Image (b) of FIG. 15 is a semantic see-through rendering focusing on the cat model where the occluding hen model has been almost completely removed or blurred. Image (c) of FIG. 15 is the regular refocusing rendering with the refocusing plane at the cat model. While the refocusing rendering manages to blur the occluding hen model fairly well, the residues of the hen model are still significantly noticeable and substantially affect viewing of the cat model that is of interest.

Figure 16:
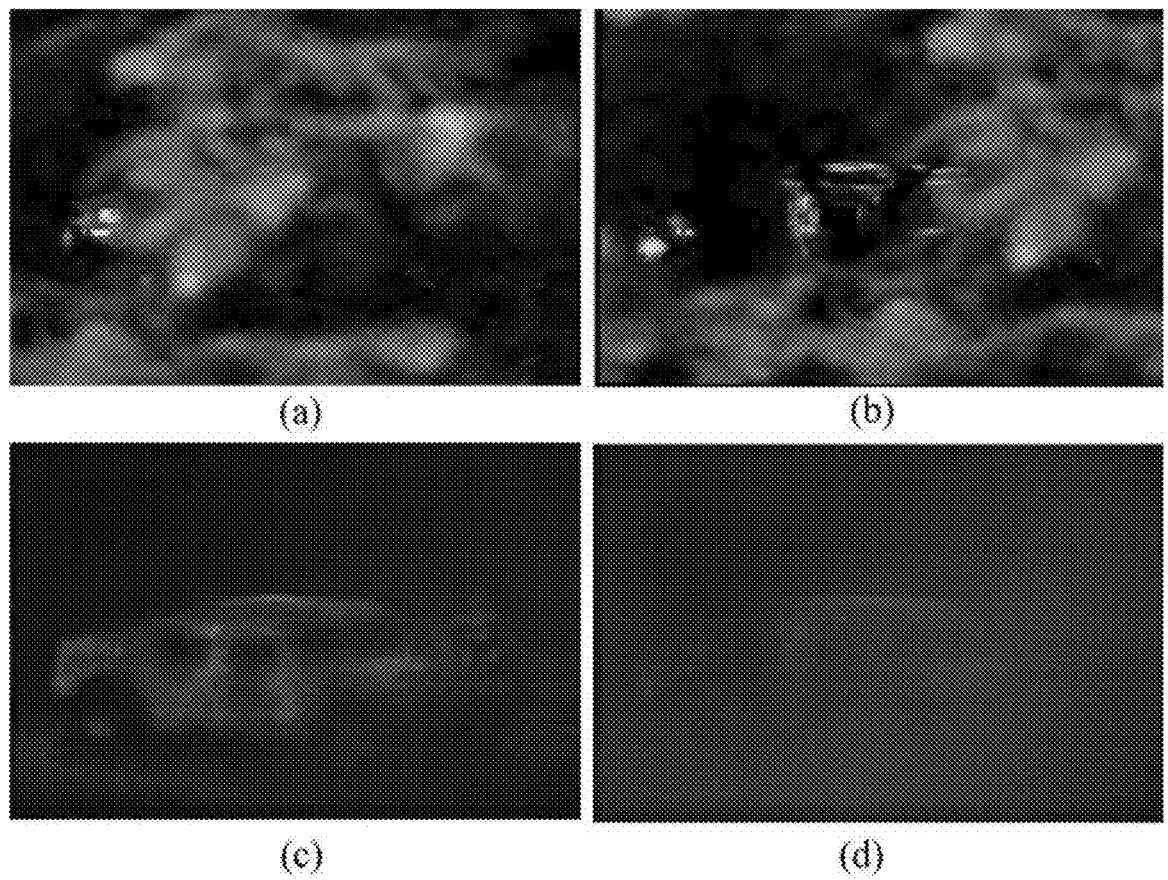

FIG. 16 shows and compares the rendering effects of the semantic see-through rendering and the regular refocusing of another light field. The light field is known as Stanford "toy Humvee and soldier behind dense foliage" light field. Images (a) and (b) of FIG. 16 are two views in the light field. Image (c) of FIG. 16 is the semantic see-through rendering which significantly enhance the see-through capability, while regular refocusing exhibits strong foreground residue, as shown in image (d) of FIG. 16.

Figure 17:

Images (a), (b), and (c) of FIG. 17 show and compare the rendering effects of the semantic see-through rendering and the regular refocusing of another three light fields. For each light field, rendering at three focal planes (Planes A, B, and C) is given and compared. The semantic see-through rendering is annotated with "SST" and the regular refocusing with "Regular." In all three comparisons, the semantic see-through rendering remarkably reduces ghosting effects and produces a clearer view of occluded objects than traditional refocusing.

Image (a) of FIG. 17 is directed to the same light field as the one in FIG. 12 (the third one, 1206), sometimes referred to as the "bush" light field. A man sits on a sofa behind the heavily foliaged bush which extremely occludes him. Traditional refocusing generates obvious ghosting artifacts on the face and body, because the method doesn't take the label information of the environment into account. Instead, the semantic see-through rendering leverages the depth and labels to assign each ray with different weight and therefore remove nearly all foreground bush when the focus is on the man. As mentioned in the background section, seeing through the occluders is crucial in security surveillance.

In image (a) of FIG. 17, Plane A is to focus on the foreground bush, Plane B on the man, and Plane C on the background wall.

Image (b) of FIG. 17 shows a second light field, sometimes referred to as the "pedestrian" light field. A man walks in front of a white car. When focusing on the car for Plane A, the semantic see-through rendering decreases the impacts of the pedestrian, and renders the car more clearly. When focusing on the building at behind for Plane C, traditional scheme renders a mixed color on the building surface, while the semantic see-through rendering renders the correct color.

Image (c) of FIG. 17 shows a third light field, sometimes referred to as Stanford "CD cases and poster" light field. For all three focal planes, the semantic see-through rendering achieves superb see-through effects. In image (c) of FIG. 17, Plane A is to focus on the foreground flowers, Plane B on the CD, and Plane C on the background poster.

In one embodiment, an image processing method for removing occluding foreground and blurring uninterested objects to create see-through effects in rendered images of a light field includes: providing information representing a light field, the representation of the light field capable of being used to generate one or more images of the light field; specifying an object of interest in the light field or a focal depth to focus on for rendering; and generating a rendered image of the light field based on the representation of the light field, wherein the image processing method in rendering differentiates objects in the light field located at different depths of field and differentiates objects in the light field belonging to distinct categories to focus on the object of interest and to create see-through effects.

In one embodiment, an image processing method operates to blur a background object behind the object of interest and to at least partially remove from the rendered image an occluding object that may prevent a viewer of the rendered image from viewing the object of interest.

In one embodiment, an image processing method operates to blur areas of the rendered image that represent an object in the light field other than the object of interest.

In one embodiment, the representation of the light field comprises a plurality of rays each of which corresponds to a pixel in the rendered image.

In one embodiment, the light field comprises a focal plane and a camera plane, wherein each ray is defined by positions of its intersections with the focal plane and the camera plane, and wherein a pixel of the rendered image is rendered by resampling rays corresponding to the pixel. In one embodiment, the resampling process is approximated by interpolating a function representing the light field with samples of pixels near the pixel to be rendered.

In one embodiment, generating a rendered image includes assigning to each ray a classification label. The each classification label corresponds to one of the distinct categories. A ray assigned a same classification label with rays corresponding to the object of interest is given a higher rendering weight than a ray assigned a different classification label.

In one embodiment, the label-guided weight assigned to a ray further depends on the focal depth specified for rendering, wherein the label-guided weight is assigned a minimum weight when the focal depth is either less than a minimum depth value or greater than a maximum depth value, wherein the minimum depth value is the minimum depth among depths of all rays which the classification label is assigned to, and the maximum depth value is the maximum depth among depths of all rays which the classification label is assigned to.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present disclosure are merely preferred embodiments, and are not intended to limit the scope of the present disclosure, which includes any modification, equivalent, or improvement that does not depart from the spirit and principles of the present disclosure.

What is claimed is:

1. An image processing method for rendering a light field, comprising:
    inputting a plurality of light filed images;

calculating a depth value for a ray in the light field;
assigning a classification label to the ray in the light field;
constructing a weight function for the light field comprising a depth component and a semantic component, where the weight function assigns the ray in the light field with a weight; and
conducting light field rendering by generating a rendered image using the weight function,
wherein the depth component and the semantic component of the weight function respectively assigns a depth-guided weight and a label-guided weight to the ray, and a joint weight for the ray is calculated by multiplying the depth-guided weight and the label-guided weight,
wherein the semantic component of the weight function is defined as follows:

$$W(s_{r_{st}}, d_f) = (1 - C_2)W^*(s_{r_{st}}, d_f) + C_2,$$

$$\text{where } W^*(s_{r_{st}}, d_f) = \max\left\{0, -\frac{(d_f - D_{min}^{st})(d_f - D_{max}^{st})}{((D_{max}^{st} - D_{min}^{st})/2)^2}\right\},$$

wherein $s_{r_{st}}$ represents the classification label for a ray $r_{st}$, $d_f$ is the focal depth, $D_{min}^{st}=\min\{d_r: s_r=s_{r_{st}}\}$ is the minimum depth among depths of all rays which the classification label $s_{r_{st}}$ is assigned to, $D_{max}^{st}=\max\{d_r: s_r=s_{r_{st}}\}$ is the maximum depth among depths of all rays which the classification label $s_{r_{st}}$ is assigned to, and $C_2$ is a second fading factor that is between 0 and 1 and determines the minimum weight.

2. An image processing method for rendering a light field, comprising:
inputting a plurality of light filed images;
calculating a depth value for a ray in the light field;
assigning a classification label to the ray in the light field;
constructing a weight function for the light field comprising a depth component and a semantic component, where the weight function assigns the ray in the light field with a weight; and
conducting light field rendering by generating a rendered image using the weight function,
wherein the depth component and the semantic component of the weight function respectively assigns a depth-guided weight and a label-guided weight to the ray, and a joint weight for the ray is calculated by multiplying the depth-guided weight and the label-guided weight,
wherein the depth component of the weight function is defined as follows:

$$W(d_{r_{st}}, d_f) = (1 - C_1)W^*(d_{r_{st}}, d_f) + C_1,$$

where $$W^*(d_{r_{st}}, d_f) = e^{-(d_f - d_{r_{st}})^2/2\sigma_d^2},$$

wherein $d_{r_{st}}$ is the depth value of the ray, $d_f$ is the focal depth, $\sigma_d$ is a standard deviation that controls how many rays are impactive for rendering, and $C_1$ is a first fading factor that is between 0 and 1.

3. The image processing method of claim 1, wherein the image processing method is configured to at least partially remove from the rendered image an occluding object that prevents the viewing of an object of interest.

4. The image processing method of claim 1, wherein calculating the depth value for the ray comprises:
training a convolutional neural network using a data set with similar and dissimilar pairs of images;
applying the trained convolutional neural network to each image patch of the pair of images to obtain an initial matching cost for the each image patch; and
applying a stereo method to refine the matching cost for the each image patch and to determine a disparity value for the each image patch.

5. The image processing method of claim 1, wherein assigning the classification label to the ray comprises:
computing a probability distribution for each pixel of the rendered image using a convolutional neural network, wherein the probability distribution for each pixel comprises probabilities that the pixel belongs to each one of the distinct categories, respectively;
calculating a confidence score for each pixel's probability distribution;
determining that a pixel's probability distribution is unreliable when the calculated confidence score for the pixel's probability distribution is below a threshold and specifying any rays that correspond to the pixel as unlabeled; and
assigning, for each of remaining pixels whose probability distribution is not determined to be unreliable, a classification label having a highest probability among the probability distribution to all rays corresponding to the each one of the remaining pixels.

6. The image processing method of claim 5, further comprising:
recalculating classification label assignments for rays that correspond to distinct objects that are separate in depth of field and rays specified as unlabeled based on depth values of these rays.

7. The image processing method of claim 6, wherein recalculating classification label assignment based on depth values of the rays comprises:
creating, for each classification label assigned to the remaining pixels, a probability distribution function for each classification label by fitting a normal distribution with the depth values of all rays to which the each classification label is assigned;
determining, for each pixel corresponding to unlabeled rays and each of the remaining pixels, a classification label whose probability distribution function value with respect to a depth value for the each pixel is highest among other classification labels; and
assigning the classification label to rays corresponding to the each pixel.

8. The image processing method of claim 1, wherein the depth component of the weight function is defined as follows:

$$W(d_{r_{st}}, d_f) = (1 - C_1)W^*(d_{r_{st}}, d_f) + C_1,$$

$$\text{where } W^*(d_{r_{st}}, d_f) = e^{-(d_f - d_{r_{st}})^2/2\sigma_d^2},$$

wherein $d_{r_{st}}$ is the depth value of the ray, $d_f$ is the focal depth, $\sigma_d$ is a standard deviation that controls how many rays are impactive for rendering, and $C_1$ is a first fading factor that is between 0 and 1.

9. The image processing method of claim 1, wherein the label-guided weight assigned to the ray further depends on the focal depth for rendering, wherein the label-guided weight is assigned a minimum weight when the focal depth is either less than a minimum depth value or greater than a maximum depth value.

10. The image processing method of claim 2, wherein the label-guided weight assigned to the ray further depends on the focal depth for rendering, wherein the label-guided weight is assigned a minimum weight when the focal depth is either less than a minimum depth value or greater than a maximum depth value.

11. The image processing method of claim 2, wherein the semantic component of the weight function is defined as follows:

$$W(s_{r_{st}}, d_f) = (1 - C_2)W^*(s_{r_{st}}, d_f) + C_2,$$

$$\text{where } W^*(s_{r_{st}}, d_f) = \max\left\{0, -\frac{(d_f - D_{min}^{st})(d_f - D_{max}^{st})}{((D_{max}^{st} - D_{min}^{st})/2)^2}\right\},$$

wherein $s_{r_{st}}$ represents the classification label for a ray $r_{st}$, $d_f$ is the focal depth,
$D_{min}^{st} = \min\{d_r: s_r = s_{r_{st}}\}$ is the minimum depth among depths of all rays which the classification label $s_{r_{st}}$ is assigned to, $D_{max}^{st} = \max\{d_r: s_r == s_{r_{st}}\}$ is the maximum depth among depths of all rays which the classification label $s_{r_{st}}$ is assigned to, and
$C_2$ is a second fading factor that is between 0 and 1 and determines the minimum weight.

12. The image processing method of claim 2, wherein the image processing method is configured to at least partially remove from the rendered image an occluding object that prevents the viewing of an object of interest.

13. The image processing method of claim 2, wherein calculating the depth value for the ray comprises:
training a convolutional neural network using a data set with similar and dissimilar pairs of images;
applying the trained convolutional neural network to each image patch of the pair of images to obtain an initial matching cost for the each image patch; and
applying a stereo method to refine the matching cost for the each image patch and to determine a disparity value for the each image patch.

14. The image processing method of claim 2, wherein assigning the classification label to the ray comprises:
computing a probability distribution for each pixel of the rendered image using a convolutional neural network, wherein the probability distribution for each pixel comprises probabilities that the pixel belongs to each one of the distinct categories, respectively;
calculating a confidence score for each pixel's probability distribution;
determining that a pixel's probability distribution is unreliable when the calculated confidence score for the pixel's probability distribution is below a threshold and specifying any rays that correspond to the pixel as unlabeled; and
assigning, for each of remaining pixels whose probability distribution is not determined to be unreliable, a classification label having a highest probability among the probability distribution to all rays corresponding to the each one of the remaining pixels.

15. The image processing method of claim 14, further comprising:
recalculating classification label assignments for rays that correspond to distinct objects that are separate in depth of field and rays specified as unlabeled based on depth values of these rays.

16. The image processing method of claim 15, wherein recalculating classification label assignment based on depth values of the rays comprises:
creating, for each classification label assigned to the remaining pixels, a probability distribution function for each classification label by fitting a normal distribution with the depth values of all rays to which the each classification label is assigned;
determining, for each pixel corresponding to unlabeled rays and each of the remaining pixels, a classification label whose probability distribution function value with respect to a depth value for the each pixel is highest among other classification labels; and
assigning the classification label to rays corresponding to the each pixel.

* * * * *

UNITED STATES PATENT AND TRADEMARK OFFICE
CERTIFICATE OF CORRECTION

PATENT NO. : 11,615,547 B2
APPLICATION NO. : 16/877471
DATED : March 28, 2023
INVENTOR(S) : Yingliang Zhang, Guli Zhang and Zhiru Shi It is certified that error appears in the above-identified patent and that said Letters Patent is hereby corrected as shown below:

In the Specification

In Column 3, Line 66, "light filed rendering that directly incorporates semantic" should read -- light field rendering that directly incorporates semantic --

In the Claims

In Claim 1, Column 20, Line 67, "inputting a plurality of light filed images;" should read -- inputting a plurality of light field images; --

In Claim 2, Column 21, Line 35, "inputting a plurality of light filed images;" should read -- inputting a plurality of light field images; --

Signed and Sealed this
Twentieth Day of June, 2023

Katherine Kelly Vidal
*Director of the United States Patent and Trademark Office*